(12) United States Patent
Reynolds et al.

(10) Patent No.: US 7,202,636 B2
(45) Date of Patent: Apr. 10, 2007

(54) METHOD AND APPARATUS FOR CHARGING BATTERIES

(75) Inventors: Jon O. Reynolds, Appleton, WI (US); David A. Stanzel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 302 days.

(21) Appl. No.: 10/915,096

(22) Filed: Aug. 10, 2004

(65) Prior Publication Data

US 2006/0033476 A1    Feb. 16, 2006

(51) Int. Cl.
*H01M 10/44*    (2006.01)
*H01M 10/46*    (2006.01)

(52) U.S. Cl. ..................................... 320/166

(58) Field of Classification Search .............. 320/115, 320/166, 167; 323/17, 26, 44, 266
See application file for complete search history.

(56) References Cited

U.S. PATENT DOCUMENTS

| | | | |
|---|---|---|---|
| 5,601,741 A | 2/1997 | Thommes | |
| 6,236,014 B1 | 5/2001 | Ulrich | |
| 6,329,636 B1 | 12/2001 | Geissler | |

*Primary Examiner*—Edward H. Tso
(74) *Attorney, Agent, or Firm*—George R. Corrigan

(57) ABSTRACT

According to a first aspect of the invention a battery charger and method of charging a battery includes an input circuit that receive an ac input having a period of T seconds and provides a dc signal. A converter receives the first dc signal and provides a converter output across a dc bus having a peak voltage of V volts. An output circuit receives the dc signal and provides a battery charging signal having a power of P watts. A controller, controls the converter to provide power factor correction. A bus capacitor is connected across the dc bus and has a capacitance of at least $(3PT)/(V^2)$ farads, or a capacitance to store sufficient energy to maintain the available output power signal through the duration of mechanical transient. The capacitance may be at least $(4PT)/(V^2)$, $(5PT)/(V^2)$, or $(5.5PT)/(V^2)$. Multiple output circuits may be provided, connected either one at a time, or a number at a time.

36 Claims, 3 Drawing Sheets

METHOD AND APPARATUS FOR CHARGING BATTERIES

FIELD OF THE INVENTION

The present invention relates generally to the art of battery charging. More specifically, it relates to battery charging using versatile circuitry that can preferably be used with a generator or with "dirty" power.

BACKGROUND OF THE INVENTION

There are a large number of rechargeable batteries having a wide variety of voltages and charging schedules. (Charging schedule, as used herein, is the manner in which the charging is performed for a given battery. For example, one charging schedule might call for a limited amount of current initially, and then a greater current when the battery voltage crosses a threshold, followed by a trickle charge after the battery voltage crosses a second threshold.) It is typical that a charger be designed for a single battery type, and have a single output voltage and charging schedule. Of course, dedicated battery chargers are not versatile, and can require a facility to have a number of chargers.

Other chargers are not dedicated, but are "dumb" chargers that apply a constant voltage output with the charging current being controlled by the load, not the charger. These chargers might work for any battery of a given voltage, but do not optimally charge batteries. Thus, if such chargers are used to charge several batteries simultaneously, they cannot provide a unique charging current or voltage for each battery. Rather, a single charging schedule is used for all batteries being charged. This also diminishes the usefulness of chargers.

Some battery chargers are inefficient because they have a poor power factor. This causes increased costs when power is utility power, and can lessen the charging capacity, particularly when using generator power. The use of generator power can cause another problem—generators often provide "dirty" power, i.e., power that is not perfectly sinusoidal, or not of a constant value. Dirty power can result in improper charging.

Prior art battery chargers are often design for a single input voltage and frequency. While this might be sufficient for consumer battery chargers, some applications, such as industrial battery charging, or automotive charging, might be used at different locations where the input power is not the same.

Rechargeable batteries have a finite life, in that their ability to be charged diminishes over time. Often, a user finds the battery is no longer chargeable by charging it, then using it, and having the battery become discharged in a short period of time.

Accordingly, a battery charger that is versatile enough to charge different types of batteries, or to simultaneously charge batteries with different outputs, is desirable. A modular design, where output circuits for particular batteries can be switched in and out by the user, is one manner to allow different charging schedules. Also, a single output module could be used for any battery type, where the user selects the battery type, or the charger senses the battery type. Preferably, such a charger will provide power factor correction, and be able to receive a wide range of inputs. Also, it will preferably be able to receive dirty power, and still charge a battery. A charger that provides the user a warning when a battery is defective is also desirable.

SUMMARY OF THE PRESENT INVENTION

According to a first aspect of the invention a method and apparatus for charging a battery includes an input circuit that receives an ac input having a period of T seconds and provides a dc signal. A converter receives the dc signal and provides a converter output across a dc bus having a peak voltage of V volts. An output circuit receives the dc signal and provides a battery charging signal having a power of P watts. A controller controls the converter to provide power factor correction. A bus capacitor is connected across the dc bus and has a capacitance of at least $(3PT)/(V^2)$ farads.

According to a second aspect of the invention a method and apparatus for charging a battery includes an input circuit that receives an ac input having a period of T seconds and provides a dc signal. A converter receives the dc signal and provides a converter output across a dc bus having a peak voltage of V volts. An output circuit receives the dc signal and provides a battery charging signal having a power of P watts. A controller controls the converter to provide power factor correction. A bus capacitor is connected across the dc bus and has a capacitance to store sufficient energy to maintain the available output power signal through the duration of mechanical transients.

According to a third aspect of the invention a method and apparatus for charging a battery includes an input circuit that receives an ac input having a period of T seconds and provides a dc signal. A converter receives the dc signal and provides a converter output across a dc bus having a peak voltage of V volts. A plurality of user-removable output circuit can be connected, one at a time, to receive the dc signal and provide a battery charging signals having a maximum power of P watts. A controller controls the converter to factor correction. A bus capacitor is connected across the dc bus and has a capacitance of at least $(3PT)/(V^2)$ farads.

According to a fourth aspect of the invention a method and apparatus for charging a battery includes an input circuit that receives an ac input having a period of T seconds and provides a dc signal. A converter receives the dc signal and provides a converter output across a dc bus having a peak voltage of V volts. A plurality of user-removable output circuit are connected to receive the dc signal and provide battery charging signals having a combined power of P watts. A controller controls the converter to provide power factor correction. A bus capacitor is connected across the dc bus and has a capacitance of at least $(3PT)/(V^2)$ farads.

The capacitance is at least $(4PT)/(V^2)$, $(5PT)/(V^2)$, and $(5.5PT)/(V^2)$ in various embodiments.

The input stage includes an input rectifier that receives the ac input signal in another embodiment.

The battery includes a second output circuit, and the output circuit and the second output circuit are connected at the same time, or mutually exclusively connected in various embodiments.

The converter is one of a buck converter, boost converter, buck-boost convert and a combined rectifier-boost converter and the output circuit includes a switched transformer in other embodiments.

Other principal features and advantages of the invention will become apparent to those skilled in the art upon review of the following drawings, the detailed description and the appended claims.

Figure 1:
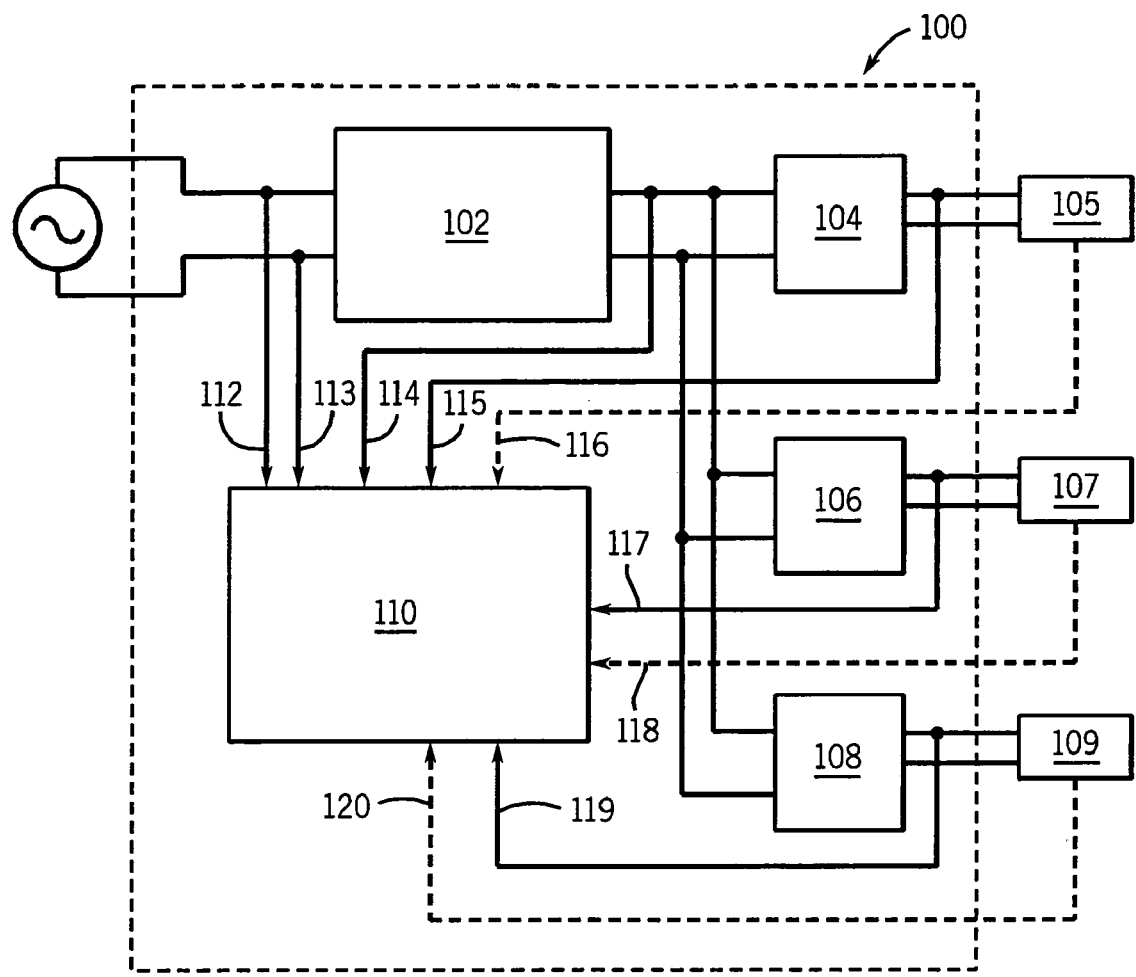
FIG. 1 is a block diagram of a battery charger in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular battery charger and particular circuitry, it should be understood at the outset that the invention may also be implemented with other circuitry, software and arrangements.

Generally, the invention is implemented by a battery charger that receives an input, such as an ac input, and provides a dc charging output. Preferably, the battery charger may receive any input over a range of inputs without being reconfigured (i.e., re-linked or re-wired), and may be capable of receiving "dirty" power, such as that from a generator. Also, the battery charger preferably includes an output stage that can either provide a number of voltages for charging different batteries, any voltage, or be designed for a single voltage. There can be a plurality of user-removable output stages. When the output circuits provides a single voltage, or a narrow range of voltages for charging one battery voltage, it is said to be designed for a particular battery voltage. In one embodiment a number of output stages are provided, each for charging one battery, wherein the batteries are of the same type or of different types.

When the output circuit is capable of charging different battery types, the user can set the battery type or voltage, or the charger can include a sensor. The sensor could be wired (i.e., connected to the battery and either sense an ID signal, or sense the voltage of the battery), or wireless, such as an RFID sensor to sense an RFID tag on a battery. The charger preferably includes a controller that causes the output to follow a charging schedule based on the battery type and/or voltage.

Another feature the charger preferably has is a "bad" battery detector, wherein the controller senses that a battery is not properly charging. The user is notified of the bad or defective battery. Another alternative provides a polarity detector to prevent damage to the battery and/or charger if the battery is connected with the wrong polarity.

The power provided for battery charging is not always ideal utility power, but might be "dirty" generator power. The present invention can provide a battery charger that is capable of running off a generator source (as well as a utility source). A capacitor or other energy storage device delivers energy to a dc bus in such a way as to reduce the impact of dirty power on the charging circuit and allows for charging during heavy loading of the generator source.

One advantage of the preferred embodiment is that it will operate using a wide range of input powers, and thus is well-suited for applications or users that use the charger in multiple locations. Various embodiments provide for an input range of at least a factor of 2, at least two utility voltages (115–230V, or 100-256V e.g.), 120V to 525V, or 100V to 633V. The preferred embodiment is relatively lightweight, adding to the charger]s portability. Additionally, the power circuit does not need to be re-linked or reconfigured by the user for different powers, thus there is less of a need to open the housing.

The details of the preferred embodiment will be provided below, but they generally include a rectifier, followed by a boost converter or a buck-boost converter, followed by a dc—dc converter, such as a pulse width or frequency modulated inverter or forward converter. A controller controls the boost converter to provide a dc bus having a desired magnitude, regardless of the magnitude and frequency of the input (within ranges), and to actively power factor correct the input. The controller also controls the dc-dc converter using feedback of the battery charging signal. Battery charging signal, as used herein, includes the signal used to charge the battery. For example, the charging current is controlled using a current feedback loop. A voltage feedback loop may be used to stop the charging process, or to change to a trickle charging mode. Controller 110 may use functions of the current and/or voltage feedback and/or temperature feedback, such as power, energy, and integrals and derivatives of the output parameters. While the feedback signals are typically indicative of a magnitude, the controller may be responsive to the signal by using a function of the value fedback.

When using the features described above, a versatile charger may be made that is capable of receiving a wide range of inputs, and charging a wide range of batteries, having a number of voltages. For example, multiple output stages may be provided and each run off the common bus. Each output stage may be controlled independently of the others, to charge either the same type of batteries, or different batteries, either one at a time or a plurality at a time.

Referring now to FIG. 1, a block diagram of a preferred embodiment of a charging system 100 is shown. Charger 100 includes a preregulator 102, a plurality of output circuits 104, 106, and 108, a controller 110, and feedback lines/control inputs 112–120 that cooperate to charge batteries 105, 107 and 109. While the embodiment illustrated includes three output circuits, other embodiments include fewer (including just one) output circuit, or many more output circuits. In various embodiments output circuits 104, 106 and 108 are fixed in place, or user interchangeable or user-removable. Controller 110 may be located on a single board or dispersed among several boards. It may be particularly useful to disperse controller 110 among several boards, one in a housing with the preregulator, and one with each output circuit, when the output circuits are user-removable.

User-removable, as used herein, includes a portion of the system being housed in such a way as the user can remove it and replace it with relative ease. For example, batteries on cordless power tools are user-removable, as are batteries in automobiles. Depending upon the application and sophistication of the user, more or less effort by the user is required to remove the output circuit.

Figure 2:
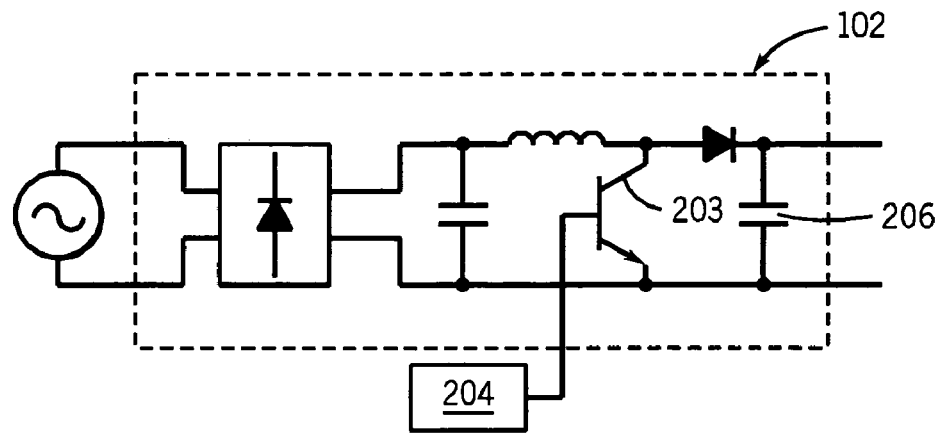
FIG. 2 is a circuit diagram of a preregulator in accordance with the preferred embodiment.
Figure 3:
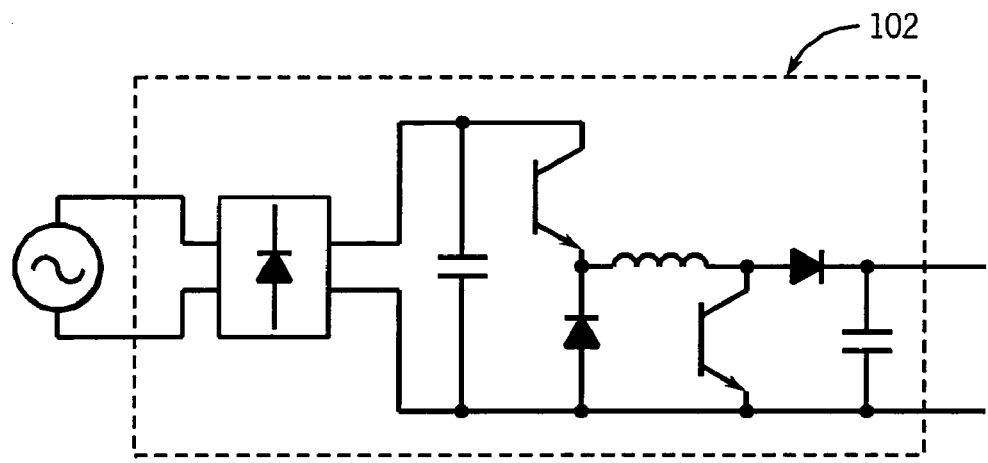
FIG. 3 is a circuit diagram of an alternative preregulator in accordance with the preferred embodiment.
Figure 4:
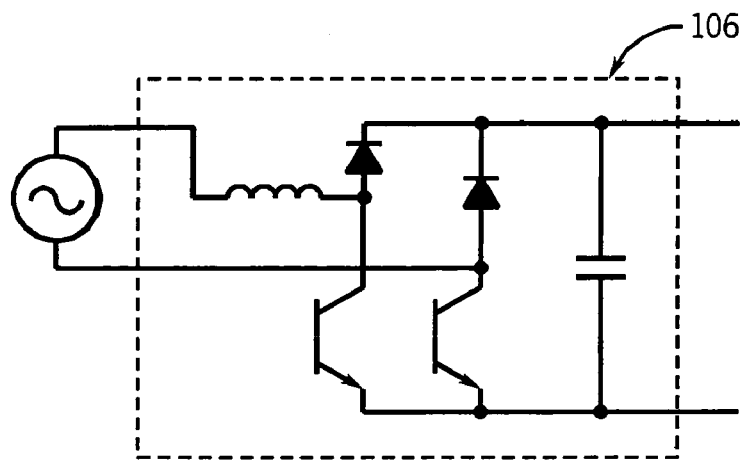
FIG. 4 is a circuit diagram of an alternative preregulator in accordance with the preferred embodiment.

The preferred embodiment provides that preregulator 102 includes a full or half-bridge rectifier (input circuit) and a boost or buck-boost circuit. Examples of such circuits are shown in FIGS. 2 and 3. Their operation is well known, and won't be described herein but a boost circuit can increase an input voltage to a desired magnitude, and a buck-boost circuit can increase or decrease an input voltage to a desired magnitude. In various embodiments the rectifier is omitted (for dc inputs, e.g.), or combined with the boost circuit, such as shown in FIG. 4. Combined rectifier-boost, as used herein, includes a circuit such as FIG. 4, where the rectifier is part of the boost circuit.

Preregulator 102 receives an ac input and provides a dc bus. AC input, as used herein, includes any utility, generator, or other ac signal. The input can be of a different type, such as dc, in other embodiments. If a dc input is used, a rectifier is not needed. The signal that causes the switch in the boost or buck-boost converter to change states is received on a control input (an input for control rather than power signals). The operation of the preregulator results in a dc bus that is has a magnitude independent of the input magnitude, and is dc, independent of the input frequency. Thus, the input signal may have any frequency and magnitude within a range of magnitudes and a range of frequencies, and preregulator 102 will still provide the desired dc bus.

Alternative embodiments include other preregulator switched converters, such as a buck, SEPIC, or CUK converter. Converter, as used herein, includes a power circuit that receives or provides an ac or dc signal, and converts it to the other of an ac or dc signal, or to a different frequency or magnitude.

Controller 110 preferably controls the preregulator to be power factor corrected to improve efficiency. The power factor correction is active, in that the controller switches the boost switch 203 to increase the power factor. The power factor correction may be accomplished using a power factor correction circuit 204 (located in controller 110), such as an off the shelf integrated circuit that provides power factor correction for boost circuits.

The output of the preregulator is a dc bus at a voltage controlled by controller 110. The preferred embodiment provides that the converter output (a dc bus) be controlled to have a voltage of 950V regardless of the input voltage or frequency. Other bus voltages may be used.

Controller, as used herein, includes digital and analog circuitry, discrete or integrated circuitry, microprocessors, DSPs, etc., and software, hardware and firmware, located on one or more boards, used to control a device such as a preregulator, power circuit, or output circuit. Controller 110 receives power from a controller power source which may be a separate transformer based source, battery, or the dc bus.

The dc bus is maintained at a substantially constant voltage (there may be ripple voltage or other voltage perturbations that do not adversely impact performance) by capacitors 206 (which may be implemented with one or more capacitors). The invention contemplates that "dirty" power might be used to charge batteries. Thus, the capacitance is selected to overcome the problems caused by dirty power.

Over time, the energy provided by the generator source must be greater than the energy used to charge the batteries. However, for lengths of time on the order of the period of the input power the charging energy maybe greater than the generator-provided energy. DC bus capacitors 206 have a capacitance, according to the present invention, sufficient to provide the difference between needed output power when and the available generator power. In the preferred embodiment, dc bus capacitor 206 can store an amount of energy equal to the energy (over time) available in approximately 2.75 cycles of the input signal, or in other words, an amount of energy equal to approximately $E=2.75(P)(T)$ joules, where P is the maximum output of the charger (combined for all output circuits) and T is the period of the generator ac signal. This overcomes the transients that occur in the input power which are typically on the order of a cycle T in length. In alternative embodiments of the present invention, capacitor 206 can store an amount of energy at least equal to the energy (over time) available in at least 1.5 cycles of the input signal (or in other words, $E=1.5(P)(T)$), in at least 2 cycles of the input signal ($E=2(P)(T)$), or in at least 2.5 cycles of the input signal ($E=2.5(P)(T)$).

Thus, the capacitance of capacitor 206 is $C=5.5(P)(T)/(V^2)$, where V is the bus voltage for $E=2.75(P)(T)$, or energy for 2.75 cycles, and $C=3(P)(T)/(V^2)$, where for 1.5 cycles, and $C=4(P)(T)/(V^2)$, for 2 cycles and $C=5(P)(T)/(V^2)$ for 2.5 cycles.

In the preferred embodiment, the approximate values of P, T, and V are: P=1250 watts, T=16.67 milliseconds (or 20 msec for 50 Hz), and V=950 volts. This results in a capacitance value for capacitor 206 of at least 127 microfarads in the preferred embodiment, and capacitance values of at least 70 microfarads, at least 92 microfarads, and at least 115 microfarads, for the various equations for C described above.

Figure 5:
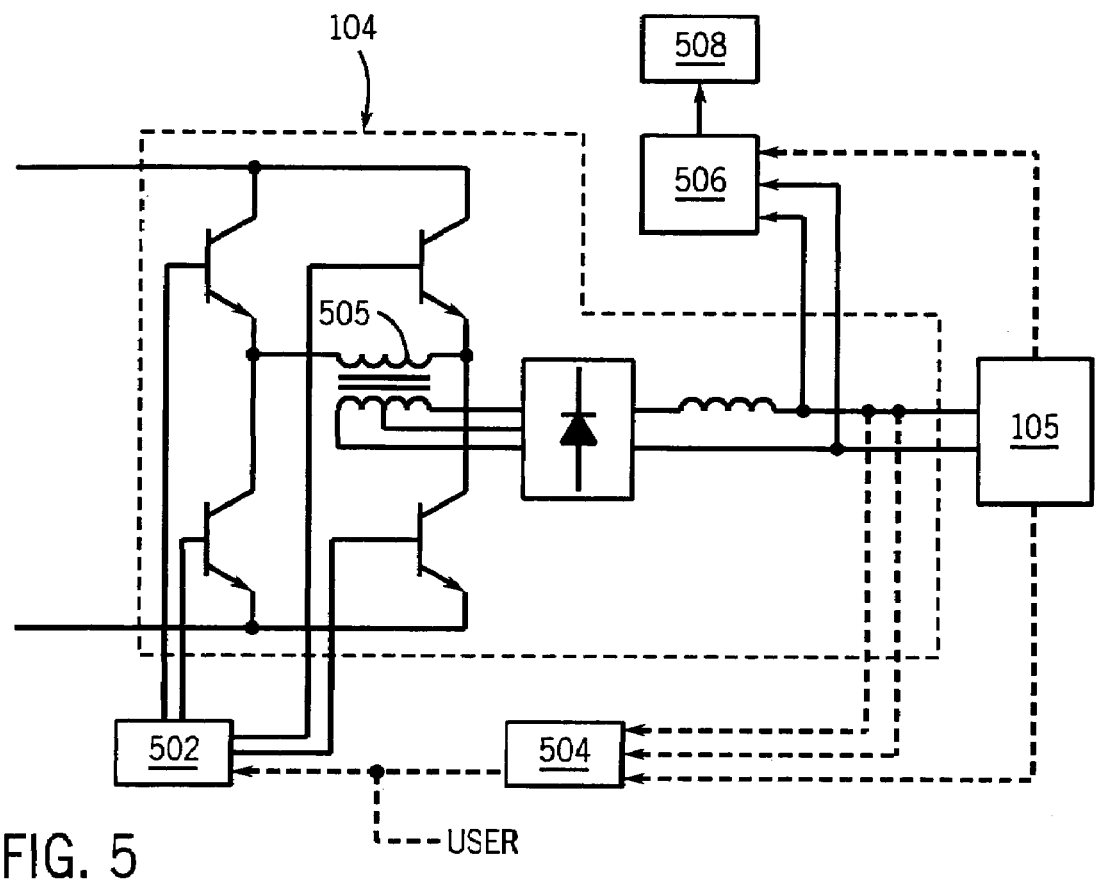
FIG. 5 is a circuit diagram of an output circuit in accordance with the preferred embodiment.
Figure 6:
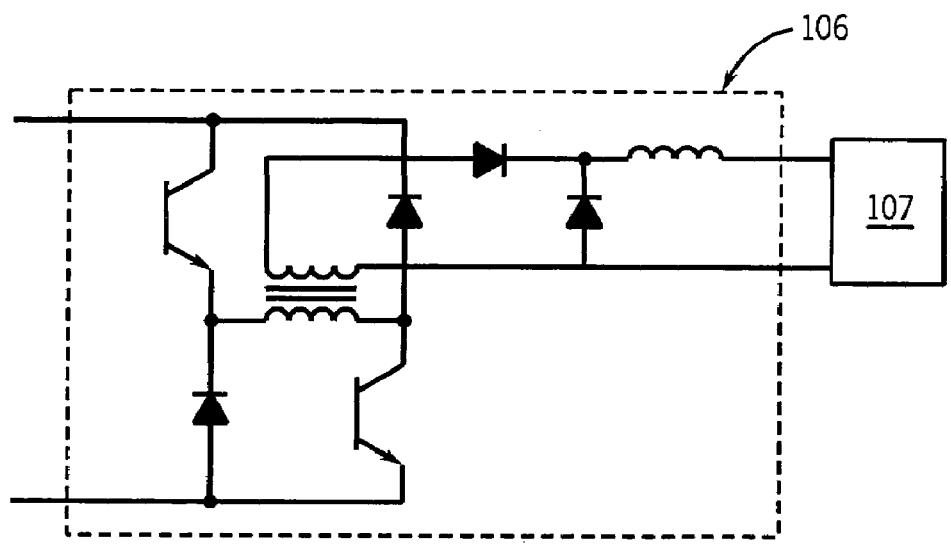
FIG. 6 is a circuit diagram of an output circuit in accordance with the preferred embodiment.

Referring now to FIGS. 5 and 6, example of preferred output circuits 104 and 106 are shown. The embodiment shown in FIG. 5 is a pulse-width modulated inverter, and the embodiment of FIG. 6 is a forward converter. The general operation of both circuits is well known. Other embodiments contemplate frequency modulation and/or other output converters, particularly converters that switch a signal applied to a transformer primary, and provide the output through the transformer secondary, thereby isolating the input and output.

The embodiment of FIG. 5 includes an inverter that, for example, inverts the 950v bus through the primary of transformer 505. The secondary of center-tapped transformer 505 is rectified and the dc signal is provided to charge the battery. Controller 110 modulates the pulse widths to provide a desired output. Various embodiments include full or half bridge topologies, or other topologies. The signal used to pulse width or frequency modulate or otherwise control the load current and/or voltage may be called a load control signal. The preferred output circuits are easily controlled to provide any output voltage. Thus, they may be used for any type of battery within a range, so long as the battery is identified (by the user or sensed, e.g.), and a charging schedule is available for that battery. Also, the preferred output circuits may be dedicated to a single battery voltage and/or type, for example by including control circuitry with the output circuit.

In one embodiment, a portion of controller 110 is included in the housing that houses output circuit 104, and monitors the output current to provide a desired charging current, in accordance with a charging schedule provided by a charging schedule module 502 (which is part of controller 110). Module, as used herein, includes software and/or hardware that cooperates to perform one or more tasks, and can include digital commands, control circuitry, power circuitry, networking hardware, etc. A charging schedule module is a module that provides a charging schedule.

Charging schedule module 502 includes a current module responsive to current feedback and a voltage module responsive to voltage feedback in the preferred embodiment. The current feedback may be considered part of an inner control loop. Voltage feedback is used in an outer control loop, to determine when the battery is nearly charged, and when the battery voltage crosses a threshold, the charging current is greatly reduced to a trickle charge. Other embodiments provide for monitoring the battery temperature, and reducing charging current based on temperature. The charging schedule can include any needed feature, such as an initial slow charge, a discharge mode, a trickle charge, etc. Integrated circuits that provide a charging schedule are commercially available.

The housing containing output circuit 104 may also include a battery sensor 504, which is part of controller 110 and senses battery 105, and provides a signal indicative of the battery type and/or voltage to charging schedule module 502. Battery sensor 504 may be wired or wirelessly connected to battery 105. A wired connection allows battery sensor 504 to determine the battery voltage and/or type from the battery terminals, or from a separate terminal on the battery which provides information of voltage and/or type. Battery sensor, as used herein, is a sensor that determines battery type and/or voltage. The battery sensor can be part of controller 110, or part of the output circuit.

A wireless connection is made when the battery has a wireless transmitter which transmits information of the battery type and voltage. One such wireless system is an RFID (radio-frequency identification) system. An RFID tag which transmits information is placed on the battery, and sensor 504 includes an RFID receiver which receives the information. The information transmitted and received can be similar to "bar code" information, or it can be more or less complex. Sensor 504 is an optical bar code reader, a WIFI receiver, a magnetic strip reader or other wireless reader various embodiments. Controller 110 includes a battery selection input that receives the information from the sensor. Battery selection input, as used herein, includes any input that receives information, sensed or provided by the user, of battery voltage and/or type. The charging schedule module is responsive to battery selection input, in that the charging schedule is chosen or modified based on the battery type.

The battery type and/or voltage is provided on a user-selectable input, such as a panel knob, button or selector, or by instructions sent on by pda, computer, wireless controller, etc. in various embodiments to the battery selection input on controller 110. User-selectable input, as used herein, includes any input sent from the user, either locally or remotely.

According to various embodiments each output circuit is designed for a particular battery type and/or voltage. The output circuits may be permanently fixed or user removable. Thus to charge a 12 volt automotive battery the user selects the 12 volt output circuit, or automotive battery output circuit, and connects it to the preregulator. Similarly, to charge a 24 volt battery, the user connects the 24 volt output circuit to the preregulator. Preferably, the connection involves snapping a housing into place, wherein an electrical connection and a structural connection is made. For example, a portable power tool battery is connected to the tool to make both an electrical and a structural connection.

The invention contemplates multiple output circuits connected to a preregulator at one time, as shown in FIG. 1. In such an embodiment, each output circuit includes its own control circuitry (that is part of controller 110) to provide the required output (which can be sensed, set, or fixed as described above). Each output circuit receives the dc bus and inverts or converts it to its particular desired output. The various output circuits may be identical or different and may provide the same or different outputs.

As described above, charging current and voltage (and battery temperature in some embodiments) is provided to controller 110. That information, or other battery characteristics, is used, in various embodiments, to determine whether a battery is defective (cannot be properly charged), either because it has reached the end of its recharging life or perhaps because of a manufacturing defect or it has been damaged. Temperature can be directly monitored or remotely sensed, such as by an infrared sensor, for example.

Controller 10 includes a defective battery sensor module 506 detects a defective battery by comparing the a battery characteristic such as current and/or voltage and/or temperature to a known profile. If the characteristic deviates beyond a threshold, controller 110 determines the battery is defective. For example, some charging schedules provide for trickle charging batteries having a voltage below a threshold. If the trickle charging fails to raise the voltage above a threshold, that battery is deemed defective. The components and or software used to detect the inability to properly charge are referred to as a defective battery sensor module.

When controller 110 determines a battery is defective it activates a user-noticeable output 508 such as a warning light, audible alarm, an instant message sent remotely or an email message. The warning can be sent by a wired connection or a wireless connection. User-noticeable output, as used herein, includes a warning indicator on a housing (such as on the housing for the output circuit or the preregulator), or a message sent to a telephone, pda, computer, remote indicator, etc.

Numerous modifications may be made to the present invention which still fall within the intended scope hereof. Thus, it should be apparent that there has been provided in accordance with the present invention a method and apparatus for battery charging that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A battery charger, comprising:
   an input circuit configured to receive an ac input having a period of T seconds and to provide a first dc signal;
   a converter configured to receive the first dc signal and to provide a converter output across a dc bus having a peak voltage of V volts, and configured to receive at least one control input;
   an output circuit configured to receive the dc signal and to provide a battery charging signal having a power of P watts;
   a controller, including a power factor correction circuit, configured to provide at least one control signal to the converter; and
   a bus capacitor connected across the dc bus wherein the bus capacitor has a capacitance of at least $(3PT)/(V^2)$ farads.

2. The battery charger of claim 1 wherein the capacitance is at least $(4PT)/(V^2)$.

3. The battery charger of claim 1 wherein the capacitance is at least $(5PT)/(V^2)$.

4. The battery charger of claim 1 wherein the input stage includes an input rectifier configured to receive the ac input signal.

5. The battery charger of claim 1, further comprising a second output circuit designed for a second battery voltage, wherein both of the output circuit and second output circuit are connected at any given time.

6. The battery charger of claim 1, further comprising a second output circuit designed for a second battery voltage, wherein one of the output circuit and second output circuit are connected at any given time.

7. The battery charger of claim 5 wherein the converter is one of a buck converter, boost converter, buck-boost convert and a combined rectifier-boost converter.

8. The battery charger of claim 1 wherein the output circuit includes a switched transformer.

9. A battery charger, comprising:
   an input circuit configured to receive an ac input having a period of T seconds and to provide a first dc signal;
   a converter configured to receive the first dc signal and to provide a converter output across a dc bus, and having a peak voltage of V volts, configured to receive at least one control input;
   a plurality of user-removable output circuits, each configured to receive the first dc signal and each designed to provide a battery charging signal at a desired voltage and a desired current, wherein a chosen one of the plurality is connected at a time and the maximum power of the battery charging signal for any of the plurality of output circuits is P watts;
   a controller, including a power factor correction circuit, configured to provide at least one control signal to the converter; and
   a bus capacitor connected across the dc bus wherein the bus capacitor has a capacitance of at least $(3PT)/(V^2)$ farads.

10. The battery charger of claim 9 wherein the capacitance is at least $(4PT)/(V^2)$.

11. The battery charger of claim 9 wherein the capacitance is at least $(5PT)/(V^2)$.

12. The battery charger of claim 1 wherein the input stage includes an input rectifier configured to receive the ac input signal.

13. The battery charger of claim 12, further comprising a second output circuit designed for a second battery voltage, wherein one of the output circuit and second output circuit are connected at any given time.

14. The battery charger of claim 13 wherein the converter is one of a buck converter, boost converter, buck-boost convert and a combined rectifier-boost converter.

15. The battery charger of claim 9 wherein the output circuit includes a switched transformer.

16. A battery charger, comprising:
   an input circuit configured to receive an ac input having a period of T seconds and to provide a first dc signal;
   a converter configured to receive the first dc signal and to provide a converter output across a de bus having a peak voltage of V volts, configured to receive at least one control input;
   a plurality of output circuits, each configured to receive the first de signal and each designed to provide a battery charging signal at a desired voltage and a desired current, wherein the total power provided by the plurality is of output circuits is P watts;
   a controller, including a power factor correction circuit, configured to provide at least one control signal to the converter; and
   a bus capacitor connected across the dc bus wherein the bus capacitor has a capacitance of at least $(3PT)/(V^2)$ farads.

17. The battery charger of claim 16 wherein the capacitance is at least $(4PT)/(V^2)$.

18. The battery charger of claim 16 wherein the capacitance is at least$(5PT)/(V^2)$.

19. The battery charger of claim 16 wherein the input stage includes an input rectifier configured to receive the ac input signal.

20. The battery charger of claim 16 wherein the input stage includes a combined rectifier-boost configured to receive the ac input signal.

21. The battery charger of claim 19 wherein the converter is one of a buck converter, boost converter, buck-boost convert and a combined rectifier-boost converter.

22. The battery charger of claim 19 wherein the output circuit includes a switched transformer.

23. A method of battery charging, comprising:
   rectifying an ac input having a period of T seconds to provide a first dc signal;
   converting the first dc signal to provide a converter output across a dc bus at, having a peak voltage of V volts, and configured to receive at least one control input;
   switching the dc bus to provide a battery charging signal having a power of P watts;
   controlling, including power factor correcting, the converting, and
   storing energy across the bus on a bus having a capacitance of at least $(3PT)/(V^2)$ farads.

24. The method of claim 1 wherein the capacitance is at least $(4PT)/(V^2)$.

25. The method charger of claim 1 wherein the capacitance is at least $(5PT)/(V^2)$.

26. The method of claim 23, further comprising a second switching of the dc bus to provide a second battery charging signal.

27. A method of charging a battery, comprising:
   rectifying an ac input having a period of T seconds to provide a first dc signal;
   converting the first dc signal to provide a converter output across a dc bus at, having a peak voltage of V volts, and configured to receive at least one control input;
   switching the dc bus with a plurality of output circuits to provide a plurality of battery charging signals having a combined power of P watts;
   controlling, including a power factor correcting, the converting, and
   storing energy across the bus on a bus having a capacitance of at least $(3PT)/(V^2)$ farads.

28. The method of claim 27 wherein the capacitance is at least $(4PT)/(V^2)$.

29. The method of claim 27 wherein the capacitance is at least $(5PT)/(V^2)$.

30. A battery charger, comprising:
   means for rectifying an ac input having a period of T seconds to provide a first dc signal;
   means for receiving the first dc signal and for converting it and providing a converter output across a dc bus at, having a peak voltage of V volts, and configured to receive at least one control input;

means for switching the dc bus to provide a battery charging signal having a power of P watts;

means for controlling, including power factor correcting, the converting, and means for storing energy across the bus on a bus having a capacitance of at least $(3PT)/(V^2)$ farads.

31. The battery charger of claim 30 wherein the capacitance is at least $(4PT)/(V^2)$.

32. The battery charger of claim 31 wherein the capacitance is at least $(5PT)/(V^2)$.

33. The battery charger of claim 30, further comprising a second means for switching of the dc bus to provide a second battery charging signal.

34. A battery charger, comprising:

means for rectifying an ac input having a period of T seconds to provide a first dc signal;

means for converting the first dc signal to provide a converter output across a dc bus at, having a peak voltage of V volts, and configured to receive at least one control input;

means for switching the dc bus with a plurality of output circuits to provide a plurality of battery charging signals having a combined power of P watts;

means for controlling, including power factor correcting, the converting, and means for storing energy across the bus on a bus having a capacitance of at least $(3PT)/(V^2)$ farads.

35. The battery charger of claim 34 wherein the capacitance is at least $(4PT)/(V^2)$.

36. The battery charger of claim 34 wherein the capacitance is at least $(5PT)/(V^2)$.

* * * * *